United States Patent [19]

Marton et al.

[11] 4,241,129
[45] Dec. 23, 1980

[54] DELAMINATION RESISTANT MULTILAYER METAL/POLYMER COMPOSITES

[75] Inventors: Henry J. Marton; Virgil B. Kurfman, both of Midland, Mich.

[73] Assignee: The Dow Chemical Company, Midland, Mich.

[21] Appl. No.: 970,098

[22] Filed: Dec. 15, 1978

[51] Int. Cl.³ .................. B32B 15/06; B32B 15/08; B32B 27/40; B32B 27/28

[52] U.S. Cl. .................. 428/216; 428/336; 428/344; 428/349; 428/355; 428/412; 428/423.3; 428/458; 428/462; 428/463; 428/425.8

[58] Field of Search ............ 428/457, 425, 412, 458, 428/462, 463, 344, 349, 355, 334, 336, 216

[56] References Cited

U.S. PATENT DOCUMENTS

| | | | |
|---|---|---|---|
| 2,992,939 | 7/1961 | Larson et al. | 428/425 X |
| 3,414,456 | 12/1968 | Roberts | 428/35 |
| 3,475,213 | 10/1969 | Stow | 428/344 X |
| 3,703,571 | 11/1972 | Roberts | 428/412 X |
| 4,115,619 | 9/1978 | Kurfman et al. | 428/457 X |

*Primary Examiner*—Harold Ansher

[57] ABSTRACT

A multilayer, metal/organic polymer composite exhibiting excellent resistance to delamination after thermoforming is provided by metallizing a substrate layer of thermoplastic organic polymer such as polystyrene or polycarbonate film and bonding the exposed metal surface to a structural plastic with a soft adhesive layer. Subsequently, the multilayer composite or at least a portion thereof can be shaped into an article which may be structurally reinforced by casting an elastomeric or rigid foamed polymer such as polyurethane foam into a cavity defined by the composite. The multilayer composites are useful in the manufacture of reflective and decorative parts for automobiles and other vehicles of transportation, as well as high barrier packages for foods and electroconductive elements.

11 Claims, 1 Drawing Figure

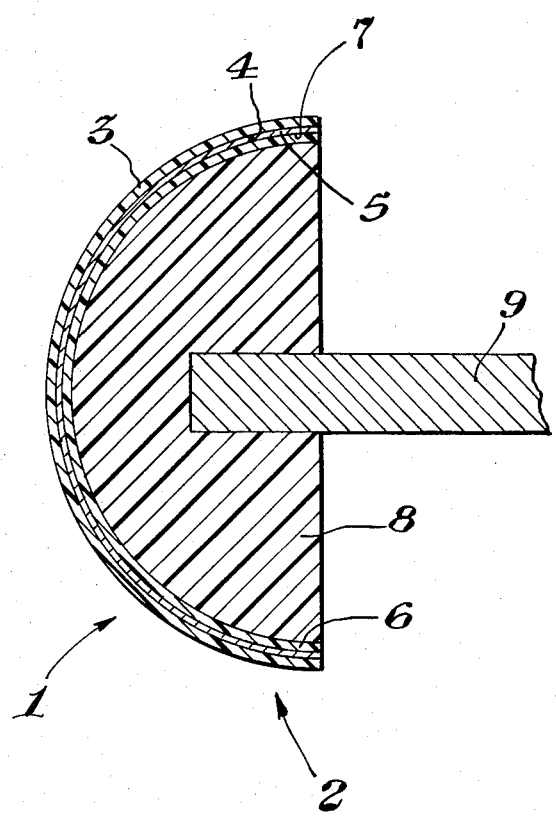

DELAMINATION RESISTANT MULTILAYER METAL/POLYMER COMPOSITES

BACKGROUND OF THE INVENTION

This invention relates to multilayer composites having at least one metal layer and at least one layer of thermoplastic organic polymer and to articles formed therefrom.

Metallized plastic articles prepared by applying a metal to a plastic material vacuum deposition, electrolytic or electroless deposition, foil lamination or similar metallizing techniques are well known. Such articles are widely employed for decorative purposes, particularly the metallized films which are quite flexible and can be shaped to some extent to conform to various contours.

Unfortunately, the degree to which such conventional metallized films or sheets or other articles can be shaped without rupture and/or separation of the metal from the polymer (herein referred to as delamination) is generally limited to those shaping procedures involving minimal dimensional changes. Even more unfortunate is the tendency of such metallized films or sheets which have been overcoated with plastic film to delaminate upon exposure to moisture and the like. As a result of such delamination, the metal layer is usually quickly destroyed upon continued exposure to the wet environment.

The tendency of the aforementioned metallized composites to delaminate upon exposure to moisture severely limits their use in many exterior applications such as bumpers, grills and other exterior brightwork in motor vehicles such as automobiles. In addition, the tendency of such metallized components to rupture upon forming or shaping into parts limits the use of such composites somewhat in barrier packaging and electrical applications as well as in the manufacture of other articles in which the composite undergoes biaxial extension to an area which is more than 50 percent greater than the original area of the composite.

In view of the aforementioned needs for useful multilayer metal/polymer composites and the deficiencies of existing metallized polymer composites, it would be highly desirable to provide a multilayer, metal/organic polymer composite that resists delamination upon exposure to moisture and exhibits excellent specular reflectance, electroconductivity and barrier to vapor transmission after substantial dimensional change.

SUMMARY OF THE INVENTION

In one aspect the present invention is a formed, multilayer metal/organic polymer composite exhibiting the aforementioned resistance to delamination upon exposure to stress and/or moisture. This composite comprises a normally solid, thermoplastic, organic substrate polymer layer having adhered thereto a normally solid thin metal layer to which is adhered a layer of a soft adhesive polymer.

Preferably this composite is a formable composite which essentially retains its original barrier, electrical and reflective properties even though at least a portion of the composite has been formed such that the portion undergoes a cumulative surface dimensional change of at least 20 percent. More specifically, this preferred multilayer composite comprises a normally solid, thermoplastic organic polymer substrate layer having adhered thereto a normally solid, soft metal layer and a soft polymer adhesive layer. By "formable multilayer composite" is meant the composite can be formed such that at least a portion undergoes the aforementioned dimensional change, preferably by extending at least a portion of the multilayer composite to an area that is at least 30 percent greater than the area of the portion before forming, without rupturing either the metal layer or the polymer layer. In this instance, it is understood that the presence of pinholes, i.e., those having average diameter less than 5 micrometers, which are often formed during metallizing and/or the extension process can be tolerated. Such pinholes do not noticeably reduce specular brightness or electroconductivity. Generally, a metal or an alloy of metals will be considered a soft metal for the purposes of this invention if it melts at a temperature or over a range of temperatures that is from about 80 to about 135 percent of the temperature used in forming the composite, said temperatures being in °K.

In yet another aspect, this invention is a shaped article comprising (1) the aforementioned composite and (2) a reinforcing material in intimate contact with the side of the composite bearing the soft adhesive layer.

Surprisingly, the multilayer composite of this invention having a soft adhesive layer bonded to one side of the thin metal layer exhibits excellent resistance to stress-induced delamination even when exposed to moisture and other conditions which tend to accelerate delamination. In contrast, metal/polymer composites which do not have the soft adhesive layer undergo substantial stress-induced delamination particularly when exposed to moisture.

The multilayer composites of this invention are usefully employed as bumpers and other reflective parts for automobiles and other vehicles of transportation, housings and decorative parts for appliances and the like. In addition, these composites are useful in electrical applications and as plastic containers exhibiting a high degree of barrier to atmospheric gases. Particularly surprising is the fact that multilayer composites of this invention, wherein the polymer layer is polyolefin, exhibit a barrier to oxygen superior to that of conventional metal/polyolefin composites wherein the metal layer is aluminum, silver or copper. For purposes of this invention, "high barrier" means that the formed composite exhibits a permeance to atmospheric gases essentially equivalent to metal foil/polymer laminate films, e.g., an oxygen transmission rate less than about 0.1 cc through a 1 mil thick film having an area of 100 square inches when exposed to a pressure difference of 1 atmosphere at a temperature of 25° C. (198° K.) over a 24 hour period (hereinafter abbreviated cc/100 in$^2$ (645 cm$^2$)/mil/day/atm). Because the formed composites of this invention can withstand wet environments, they are especially desirable for the packaging of oxygen-sensitive wet foods such as applesauce, fruit and catsup as well as dry food such as coffee, potato chips and the like.

BRIEF DESCRIPTION OF THE DRAWING

The drawing is a side view in cross-section of a preferred shaped article of the invention.

DETAILED DESCRIPTION OF THE EMBODIMENTS

In the drawing there is depicted a preferred shaped article 1 having a shell 2 of a formed, multilayer metal/organic polymer composite. The outer layer 3 of the shell 2 comprises a normally solid, thermoplastic polymer and has a surface 4 to which is intimately bonded a layer 5 of a soft metal. An inner layer 6 of a soft adhesive organic polymer adheres to surface 7 of the metal layer 5. The shell 2 defines a cavity 8 which is filled in part with a polymeric filler material which may be either foamed or nonfoamed, rigid or flexible, and elastomeric or nonelastomeric. Embedded in the polymeric filler material is a mounting strut 9 for affixing the shaped article to a substrate as desired.

Polymers suitably employed in the polymer substrate layer(s) of the multilayer composites of this invention are those normally solid, organic, formable thermoplastic polymers that are readily shaped or molded or otherwise fabricated into desired forms. By the term "formable" is meant that the polymer can be stretched or otherwise extended without rupturing to occupy an area which is at least 30 percent greater than its original area, preferably more than 100 percent and most preferably more than 150 percent. The term "thermoplastic" as used herein is intended to include all synthetic resins that may be softened by heat and then regain their original properties upon cooling. Also included within this term are thermosetting resins in the β stage, i.e., that stage prior to crosslinking wherein the resin exhibits the heat plastification characteristics of a thermoplastic resin. In some preferred embodiments, the thermoplastic polymers are also generally transparent. Preferably, the polymer has a second order transition temperature (Tg) greater than 320° K., more preferably greater than 350° K.

Because of their lower cost and superior structural properties, polymers of particular interest for use as the polymer substrate layer include engineering plastics such as polystyrene, styrene/acrylonitrile copolymers, copolymers containing polymerized styrene, acrylonitrile and butadiene (often called ABS polymers), styrene/butadiene copolymers, rubber modified styrene polymers, styrene/maleic anhydride copolymers and similar polymers of monovinylidene aromatic carbocyclic monomers; polycarbonates including those made from reaction of phosgene and bisphenol A and/or phenolphthalein; copolyester carbonates such as described in U.S. Pat. No. 4,105,633; polyesters such as polyethylene terephthalate and copolyesters, e.g., copolymers produced by the reactions of terephthalic acid and isophthalic acid with 1,4-cyclohexylenedimethanol; acrylic resins such as poly(methyl methacrylate); polyacetyl resins such as polyformaldehyde resin; nitrile resins such as polyacrylonitrile and other polymers of α,β-ethylenically unsaturated nitriles such as acrylonitrile/methyl methacrylate copolymers; polyamides such as nylon; polyolefins such as polyethylene and polypropylene; polyvinyl halides such as polyvinylchloride and vinylidene chloride homopolymers and copolymers; polyurethanes; polyallomers; polyphenylene oxides; polymers of fluorinated olefins such as polytetrafluoroethylene; and other normally solid polymers which can be formed while in the solid state into the desired shape by conventional forming techniques, e.g., cold drawing, vacuum drawing, drape molding, pressure thermoforming, scrapless thermoforming procedures and the like. Especially preferred, particularly for polymer layers which must exhibit significant abrasion resistance as well as a high degree of transparency, are the copolyester carbonates and the polycarbonates, particularly those derived from the bis(4-hydroxyphenol)alkylidenes (often called bisphenol A types) and those derived from the combination of such bisphenol A type diols with phenolphthalein type diols. It is understood that the polymer layer of the multilayered composite may also contain one or more additaments such as dyes, light stabilizers, reinforcement fillers and fibers, pigments, carbon black and the like.

The thickness of the polymer substrate layer(s) of the composite is not particularly critical. Therefore, the polymer substrate layer is of suitable thickness if it can be formed into a continuous layer which will have the necessary strength to survive the conditions normal to its intended use. Accordingly, such properties will often be abrasion resistance, corrosion resistance, high tensile or impact strength and other physical properties which will be evident to those skilled in the art of fabricating polymers and metallized polymers. Usually, the thickness of the polymer substrate layer(s) is in the range from about 2 to about 10,000 micrometers, preferably from about 10 to about 500 micrometers.

The thin metal layer(s) of the composite suitably comprises any metal or alloy of two or more metals which will adhere to the aforementioned polymer layer(s), i.e., forms a metal-to-polymer adhesion bond which is sufficient to withstand the following tape-adhesion test.

A pressure sensitive adhesive tape which is 1.9 cm wide and 40 ounces/inch wide adhesive of bond strength (U.S. Government Specification PPP 60-B, Class 2) is applied to a clean metal surface of the metal/-substrate polymer composite to be tested. Approximately 12–15 cm of the tape is pressed against the metal surface to assure good contact and eliminate any trapped air bubbles. After 5 seconds, the free end of the tape is quickly removed in a direction perpendicular to the metal surface. Adhesion of the metal to the substrate polymer is suitable if no metal piece having an area greater than 1 cm$^2$, preferably <0.01 cm$^2$, most preferably <0.0001 cm$^2$, is removed from the substrate polymer. It is also preferred that similar adhesion is shown after the composite has been soaked in water for 2 hours at 25° C. wherein the wet sample is wiped dry within 30 seconds after removal from the water and the tape is pulled from the composite within one minute after the composite is removed from the water.

Examples of such suitable metals include aluminum, copper, tin, lead, zinc and cadmium as well as alloys thereof. While iron and alloys of iron with other metals are suitable, they are generally less desirable than the foregoing metals due to corrosion and forming problems normally experienced with iron and iron alloys.

The preferred metal layer(s) of the multilayer composite comprises a metal or an alloy of two or more metals that melts at a temperature or over a range of temperatures ($T_s$-solidus temperature) that is from about 80 to about 135 percent of the maximum temperature reached by the metal composite during forming, said temperatures being in °K. Preferably, the metal or alloy of metals melts at a temperature or over a range of temperatures that is from about 90 to about 110 percent of the forming temperature. In preferred embodiments, the metal or alloy has a liquidus temperature ($T_1$-lowest temperature in °K. at which the metal or alloy is entirely liquid) and a solidus temperature ($T_s$-temperature in °K. at which the metal or alloy just begins to liquefy) which are within the temperature range of 0.80 $T_f$ to 1.35 $T_f$ wherein $T_f$ is the temperature in °K. at which the composite is formed.

Typically, such preferred metal alloys can be further characterized as containing at least 50 weight percent, more advantageously from about 60 to about 87 weight percent, of at least one metal having a melting point below 450° C. (723° K.) and at least 5 weight percent, most advantageously from about 10 to about 47 weight percent, of at least one other metal also having a melting point below 450° C. (723° K.). Especially preferred are alloys similar to the preceding preferred metal alloys which additionally contain at least 0.1 weight percent, most advantageously from about 3 to about 20 weight percent, of a metal having a melting point above 450° C. (723° K.).

An example of a preferred metal is indium, whereas alloys of two or more of the following metals may be employed: cadmium, indium, tin, antimony, zinc, lead, bismuth and silver. In addition, other metals may be present in the alloys so long as the melting range of the alloy is within the prescribed range of 80 to 135 percent of the forming temperature. Representative of such alloys are those containing at least 50 weight percent of one or more of antimony, indium, bismuth, tin, zinc, cadmium and lead; from 0 to about 10 weight percent of one or more metals such as manganese, nickel, iron and other metals having melting points greater than 1100° C. (1373° K.); and a remaining amount of one or more of silver, copper, gold, aluminum and magnesium. Of special interest are alloys having a solidus temperature less than 650° K., preferably less than 548° K., and containing at least 60 weight percent of at least one of indium, bismuth, tin, zinc, cadmium, antimony and lead and not more than 95, preferably not more than 90 and most preferably not more than 80, weight percent of any one metal.

Illustrative preferred alloys contain at least 5 weight percent of at least two of the following metals: tin, bismuth, lead, zinc, cadmium and antimony. Examples of preferred alloys are the following alloys comprising metals in the indicated weight percentages: alloy (1)- from about 5 to about 95 percent tin, from about 5 to about 95 percent bismuth and from about 0 to about 40 percent copper; alloy(2)-from about 5 to about 95 percent tin, from about 5 to about 95 percent bismuth and from 0 to 49.9 percent silver; alloy(3)-from about 5 to about 95 percent zinc, from about 5 to about 95 percent cadmium and from 0 to 49.9 percent silver; alloy(4)- from about 5 to about 95 percent zinc, from about 5 to about 95 percent cadmium and 9 to about 10 percent magnesium; alloy(5)-from about 0.1 to about 95 percent tin and from about 5 to about 99.9 percent indium; alloy(6)-from about 5 to about 95 percent tin, from about 5 to about 95 percent lead and from 0 to about 40 percent copper; alloy(7)-from about 5 to about 95 percent tin, from about 5 to about 95 percent lead and 0 to 49.9 percent silver; alloy(8)-from about 5 to about 95 percent tin, from about 5 to about 30 percent antimony and from 0 to 40 percent copper; alloy(9)- from about 40 to about 94 percent tin, from about 3 to about 30 percent antimony, from about 3 to about 57 percent bismuth and from 0 to about 40 percent copper; alloy(10)-from about 90 to about 99.9 weight percent indium and from about 0.1 to 10 weight percent of at least one of copper, silver, gold, nickel, bismuth, tin, zinc, cadmium, antimony and lead; alloy(11)-from about 75 to about 99.9, especially 85 to 98, weight percent of at least one of indium, bismuth, tin, zinc, cadmium, antimony and lead and from about 0.1 to about 25, especially 2 to 15, weight percent of at least one of copper, silver, gold, nickel, magnesium and aluminum, provided that alloy(11) contain no more than 90 weight percent of any one metal. Also preferred are alloys of tin, silver and indium, alloys of zinc, cadmium and indium, alloys of indium and silver, alloys of tin and cadmium, alloys of silver and indium and alloys of magnesium and aluminum. Of the aforementiond alloys, alloys of tin and bismuth are more preferred with alloys of tin, bismuth and copper being most preferred.

It should be understood, however, that preference for the different alloys will vary depending on the end use. For example, alloys of tin and copper, alloys of tin and silver and alloys of tin, bismuth and copper show superior corrosion resistance compared to alloys of zinc and cadmium. Similarly, alloys of tin, bismuth and copper and alloys of tin and copper would be more acceptable in food packaging than would be more toxic alloys of tin and lead.

Moreover, it is observed that preference for various alloys will vary with the different polymer layers used in the multilayer composite. For example, it is observed that the alloys of tin and copper, the alloys of tin and silver, the alloys of indium and silver, the alloys of tin, bismuth and copper, and the alloys of zinc and cadmium are preferred when the multilayer composite is to be formed at temperatures from about 25° C. (298° K.) to about 175° C. (448° K.) as in the case when the polymer layer consists essentially of polycarbonate.

In addition, it has been generally observed that the more concentrated alloys, i.e., those containing larger amounts, e.g., more than 20 weight percent (preferably 25 weight percent or more) of the minor components of the alloy, are generally more easily extended than the more dilute alloys, i.e., those containing very substantial amounts of the major component of the alloy and minimal amounts of the minor component or components. For example, an alloy of 75 weight percent tin and 25 weight percent silver is superior in regard to plastic character than an alloy of 90 percent tin and 10 percent silver. Also, an alloy of 50 percent tin and 50 percent indium exhibits extendibility superior to that of an alloy of 90 percent tin and 10 percent indium.

Also, it is noted that alloys of tin, bismuth and a higher melting metal such as copper, silver, nickel, magnesium, gold, iron, chromium and manganese, particularly those containing (1) at least 8 weight percent each of tin and bismuth and (2) more bismuth than the higher melting metal, exhibit excellent adhesion and forming characteristics. For example, composites employing these alloys may be formed at temperatures at which the polymer and most of the alloy melt without loss of adhesion or integrity (continuity of the metal layer). These multilayer composites exhibit superior vapor barrier characteristics and may be flexed a number of times without an apparent loss of continuity of the metal layer. Of the alloys of these highly adherent composites, alloys of particular interest consist essentially of from about 25 to about 90, preferably 60–80, weight percent tin; from about 8 to about 60, preferably 8 to 30, most preferably 12 to 25, weight percent bismuth; and from about 1 to about 25, preferably 4 to 12, weight percent of higher melting metal, preferably copper or silver.

Since the normal thermoplastic polymers which will be utilized as the polymer substrate layer are preferably formed at temperatures in the range from about 25° C. (298° K.) to 200° C. (473° K.), preferably 100° C. (373° K.) to 200° C. (473° K.), it will be generally desirable that the metals and metal alloys preferably employed in the practice of this invention will have melting points or melting point ranges (herein referred to as solidus temperature—$T_s$) within the range from about 100° C. (373° K.) to about 400° C. (673° K.), most preferably from about 130° C. (403° K.) to about 275° C. (548° K.). For the purposes of this invention, the melting point of a metal or the melting range of an alloy of metals is defined as the temperature or range of temperatures at which solid and liquid forms of the metal or alloy are in equilibrium. The alloys typically do not melt entirely at a single temperature but will melt gradually over a fairly wide temperature range.

The thickness of the thin metal layer is critically less than that which inherently delaminates from the polymer layer. Preferably, the thickness of the thin metal layer is less than about 1 micrometer ($\mu$m), e.g., from about 0.002 to about 1 $\mu$m, more preferably from about 0.01 to about 0.5 $\mu$m, most preferably from about 0.01 to about 0.3 $\mu$m. Moreover, when the metal of the metal layer has a Young's Modulus greater than 10 million pounds per square inch (psi), the thickness of the metal layer is preferably less than 0.1 $\mu$m.

The soft adhesive layer suitably comprises any normally solid organic polymer which adheres to the metal layer and has toughness and modulus such that upon adhering the composite to a rigid substrate the tendency of the metal layer to separate from the substrate polymer layer is measurably reduced. Advantageously, the soft adhesive polymer has a Young's Modulus less than about 1500 psi, a Shore Hardness (Shore A) of less than about 82, an elongation greater than 50 percent and a tensile strength greater than 10 psi. For the purposes of this invention, Young's Modulus (modulus of elasticity) is that modulus determined by ASTM D-638. Preferably, the soft adhesive polymer has Young's Modulus less than about 1100 psi and a Shore Hardness (Shore A) of less than about 75. The more preferred soft adhesive polymers are elastomers as defined by Charles A. Harper in *Handbook of Plastics and Elastomers*, McGraw-Hill, glossary p. 5 (1975). The term "modulus" as applied to such elastomers generally means the tensile stress of the elastomer at an arbitrary elongation, e.g., 300%. See J. R. Scott, *Physical Testing of Rubbers*, Palmerton Publishing Co. Inc., p. 60 (1965).

A soft adhesive layer is adherent to the metal layer if it exhibits a peel strength of at least 100 grams/centimeter (g/cm), preferably at least 500 g/cm, when the soft adhesive layer is applied to a clean test block of the metal having a surface finish of less than about 5 $\mu$m in roughness. A static mass method (ASTM D-413) is advantageously employed to measure peel strength wherein a strip specimen is considered to pass when a given force of at least 100 g/cm applied to pull the adhesive layer from the metal block causes a rate of separation less than 0.1 cm per second for a period of 100 seconds.

Preferably, the soft adhesive polymer has a second order transition temperature (Tg) less than about 300° K., a melt flow viscosity (ASTM D-1238 (Condition G)) of at least about 1 decigram/minute, an elongation (ASTM D-412) greater than 200% and a tensile strength (ASTM D-412) greater than 500 psi. Preferably, the soft adhesive polymer has a tensile strength greater than its Young's Modulus.

Exemplary soft adhesive polymers include diene rubber polymers such as polybutadiene and polyisoprene; ABS resins such as polybutadiene rubber modified styrene/acrylonitrile copolymers; thermoplastic rubbers such as block copolymers having polystyrene blocks and polybutadiene blocks, block copolymers having polystyrene blocks and polyisoprene blocks, as well as block copolymers having polystyrene blocks and polyolefin blocks wherein the olefin is ethylene, propylene, isobutylene or mixtures thereof; polyurethanes; various blends including chemically crosslinked blends of polyolefins such as polyisobutylene and polyethylene with rubber such as neoprene, butyl rubber, etc.; ethylene/vinyl acetate copolymers containing from 25 to 50 weight percent of vinyl acetate and the like. Of the foregoing, polyurethanes and the aforementioned polystyrene block copolymers are preferred, with the polystyrene block copolymers being especially preferred.

While the thickness of the soft adhesive layer is not extremely critical, it is preferably from about 25 to about 250 $\mu$m, especially from about 50 to about 150 $\mu$m. When the thickness of the soft adhesive layer is less than 50 $\mu$m, the Young's Modulus of the soft adhesive is preferably less than about 250 psi.

The composites of the present invention are suitably prepared by any conventional method for making multilayer metal/organic polymer composites wherein the layers of metal and polymer adhere to each other. For example, the metal may be applied as a coating by a conventional metallization technique such as an electroless process described by F. A. Lowenheim in "Metal Coatings of Plastics," Noyes Data Corporation (1970), by Pinter, S. H. et al., *Plastics: Surface and Finish*, Daniel Davey & Company, Inc., 172–186 (1971) or in U.S. Pat. No. 2,464,143. An especially preferred metallization technique in the practice of this invention is a vacuum deposition technique wherein the metal is vacuum evaporated and then deposited onto the polymer substrate layer as described by William Goldie in *Metallic Coating of Plastics*, Vol. I, Electrochemical Publications Limited, Chap. 12 (1968). Another preferred metallization technique includes sputter coating as described in Chapter 13 of Goldie, supra. Also suitable but less preferred metallization techniques include electroplating and ion plating.

In the formation of a composite wherein the polymer substrate layer comprises a fairly polar polymer such as polycarbonate, polyester, polyvinyl halide or polyvinylidene halide, polyvinyl alcohol, acrylic polymers and other known polar polymers, it is generally not necessary to pretreat the polymer substrate layer prior to application of the metal layer. However, when relatively nonpolar polymers, e.g., polystyrene or polyethylene are to be employed, it is often desirable to treat the surface of the polymer substrate layers sufficiently to enhance bonding between the metal and the polymer. Such pretreatments can include gas phase sulfonation as described in U.S. Pat. No. 3,625,751 to Walles and especially the procedure described in Lindblom et al. in U.S. Pat. No. 3,686,018. Other suitable methods for pretreating the polymer include corona discharge, flame treatment, liquid phase sulfonation and the like.

The soft adhesive polymer may be applied to the exposed surface of the thin metal layer by any of several known techniques such as casting from solvents, hot melt coating and latex coating wherein coating apparatuses such as rollers, extruders, flexographic coaters and spray coaters are employed.

While the metal layer may be applied to either or both sides of the polymer layer(s), it is generally desirable to apply the metal layer to only one surface of the polymer layer. Accordingly, in a shaped article as shown in the drawing, the polymer substrate layer provides protection against abrasion of the metal layer which would cause degradation of the highly reflective character of the article. It is understood, however, that when the metal layer is applied to the surface of the polymer substrate layer which will be exposed in the final article, such exposed metal layer can be protected by coating with some other protective coating material provided that a soft adhesive layer is interposed between the metal layer and the protective coating material. Examples of such materials suitably employed as protective coatings for the metal layer include polycarbonates such as those derived from bisphenol-A and/or phenolphthalein, polyesters such as polyethylene terephthalate, acrylic polymers such as poly(methyl methacrylate), saran polymers such as vinylidene chloride copolymers, polyepoxides, alkyd resins, polyurethanes and the like. An exemplary method for overcoating the soft adhesive layer is described in U.S. Pat. No. 3,916,048 wherein the protective polymer in the form of a latex is applied to the soft adhesive layer and dried to form a continuous film at a temperature below the heat distortion point of the polymer layer. By following this technique, it is possible to form the metal composite before or after application of the protective coating.

When further shaping of the composite is desired, the resulting multilayer composite having a preferred formable metal layer is advantageously formed by a conventional forming process, e.g., thermoforming or solid phase forming, to the desired shape. Preferably, the forming process is a conventional thermoforming process for shaping sheet stock which process is normally carried out at temperatures from about the second order transition temperature (Tg) of the polymer substrate layer up to and including temperatures at or above the melting point of the substrate polymer provided that the substrate polymer has sufficient melt strength to undergo the forming operation without rupturing. Exemplary thermoforming processes include differential air pressure thermoforming, match dye thermoforming, vacuum forming, plug assist-vacuum forming, draw forming, impact forming, rubber pad forming, hydroforming, drape molding and the like. Since most thermoplastics polymers preferably employed in the practice of this invention have melting points less than 200° C. (473° K.), it is generally advantageous to thermoform the composite at a temperature from about 25° C. (298° K.) to about 200° C. (473° K.), most preferably from about 90° C. (363° K.) to about 180° C. (453° K.). Alternatively, the composite may be formed by solid phase forming which is carried out at temperatures below the melting point of the polymer. Exemplary solid phase forming methods include cold rolling, impact extrusion, forging, forward extrusion, cold heading and rubber-pad forming, e.g., as such methods are further described by P. M. Coffman in *Soc. Plas. Eng. Journal*, Vol. 25, January, 1969 (50–54) and *Soc. Auto. Eng. Journal*, Vol. 76, No. 6, 36–41 (1968).

In the forming operation performed herein on preferred composites having the preferred metal layers described hereinbefore, the entire composite or a portion thereof is formed or shaped in a manner such that at least a portion of the composite undergoes a cumulative surface dimensional change of at least 20 percent, advantageously at least 30 percent. By cumulative surface dimensional change is meant the combined change of length and width wherein a decrease as well as an increase in a particular dimension is treated as a positive charge. Further, only one or both surface dimensions may be changed in the forming operation. Techniques for observing surface dimensional changes are described by A. Nadai in *Plasticity*, McGraw-Hill (1931). Preferably, the composite or a portion thereof is extended (stretched) to an area which is at least 30 percent greater than its original area, more preferably from about 50 to about 300 percent, most preferably from about 150 to about 300 percent. When only a portion of the composite is extended, it is that portion being extended which undergoes the aforementioned increase in area. An example of such portion extension or stretching is in the forming of an automobile bumper, a rimmed cup, blister package and certain reflectors. While the portion may be as small as 1 mm$^2$, it is usually larger than 1 cm$^2$ and preferably greater than 50 cm$^2$. The actual degree of extension, of course, will vary with the intended end use.

Following the forming operation, the formed composite may be utilized without further fabrication, as is the case for most packaging and electroconductive applications. In these applications the formed multilayer composite can be used as tubs or similar deep drawn containers for various oxygen sensitive foods as described herein, as packaging films, as printed circuit stock for electrical and electronic equipment, and the like. In such applications, if the metal layer is not protected on both sides by the polymer layer and/or a protective polymer coating layer as described hereinbefore, it is desirable to coat the metal layer with a protective coating as described hereinbefore.

In addition to the foregoing uses, a formed composite generally defining a cavity as shown in the drawing is reinforced by filling the enclosed or partially enclosed cavity with a reinforcing material such that the reinforcing material adheres to the exposed surface of the soft adhesive polymer. Alternatively, the reinforcing material may be adhered to the surface of the composite outermost from the cavity or concave shape as in the case of the reflector for an automobile taillamp. The type of reinforcing material employed is not particularly critical. For example, the material may be metal such as steel, wood, stone, concrete and plastic, with plastic materials being preferred. The reinforcing polymeric filler materials of particular interest may be foamed or nonfoamed, rigid or flexible, elastomeric or nonelastomeric. They may be pure (non-filled) or filled with pigments, stabilizers, reinforcing fibers such as glass fibers, fillers and the like. They may be blends of polymers which may contain cross-linking components.

Examples of suitable rigid polymeric materials include polyurethane, polystyrene, epoxy polymers, polyvinyl chloride, vinylac resin, silicone polymers, cellulosic polymers, acrylic polymers, saturated polyesters and unsaturated polyesters, asphalt and the like. Of these materials the polyurethanes are generally preferred. Additional examples of such rigid materials, particularly in the form of foams and methods for preparing the same, are more completely described in U.S. Pat. No. 3,703,571. The rigid polymers and rigid polymer foams are particularly useful in the fabrication of articles which are not exposed to significant amounts of impact.

In the production of articles such as bumpers and external trim for automobiles and other vehicles of transportation that are exposed to impact, it is desirable to employ an elastomeric polymer, preferably in the form of a foam, as the reinforcing material. Examples of such elastomeric polymers include elastomeric polyurethanes, rubbery styrene/butadiene copolymers, polybutadiene rubber, natural rubber, ethylene polymers, particularly ethylene/propylene copolymer rubber and the like. Such elastomeric polymers, whether solid or foamed, and methods for their preparation are well known to those skilled in the art and therefore will not be discussed in greater detail here. Other suitable reinforcing polymeric materials include polyethylene foam, chlorinated polyethylene and blends of two or more of the aforementioned reinforcing materials.

The reinforcing material is readily cast onto the shaped multilayered composite by any of a wide variety of casting techniques. For example, a reinforcing material may be applied by foamed-in-place or pour-in-place techniques as well as spray applications, slush castings or rotational casting application. Exemplary methods are described in more detail in U.S. Pat. No. 3,414,456. It is desirable that the conditions of the casting technique be employed such that the formed composite does not deform during casting, foaming, and/or curing steps which may be employed. However, if such deforming conditions are employed at this time, a support mold for the thermoformed composite is required.

The following examples are given to illustrate some specific embodiments of the invention and should not be construed as limiting the scope thereof. In the following examples, all parts and percentages are by weight unless otherwise indicated.

EXAMPLE 1

Metallization

A rectangular section (27cm × 27 cm) of polycarbonate film (bisphenol-A homopolymer sold under the tradename "Carbonex" by Cloudsley Corp. of Cincinnati, Ohio) having a thickness of 125 micrometers is washed with distilled water and dried at 60° C. for approximately one-half hour. A tungsten wire basket situated in a vacuumizable bell jar and electrically attached to a filament control of a 5 kilovolt electron beam power supply is loaded with an aluminum pellet (0.02 g) and the polycarbonate film is placed in the jar above the filament. The film is configured to the shape of the partial cylinder having a radius of about 12.7 cm by taping the film to a rigid metal sheet of that configuration. The configured film is positioned in the bell jar space such that the axis of the cylinder is proximate to the filament in order to achieve a fairly uniform thickness of the metal to be deposited. The bell jar is closed and the system is evacuated to a pressure of $3 \times 10^{-5}$ mm Hg. The electrical current to the filament is turned on and adjusted to a nominal current of 0.8 amps and maintained there for 30 seconds and then turned off for 1 minute. The same cycle is repeated and subsequently the bell jar is opened to atmospheric pressure.

Application of Soft Adhesive Polymer

A segment of metallized substrate polymer film is placed on the lower heated platen of a platen press. A ~0.2-g portion of a soft adhesive polymer (a polystyrene/polybutadiene block copolymer) in the form of pellets is sprinkled over the surface of the metal layer of the metallized film and a second segment of metallized substrate polymer film is placed over the adhesive pellets. The upper heated platen of the press is clamped into position and the platens are maintained at 140° C. until the soft adhesive forms a continuous bonding layer. When the substrate polymer of the metallized film is tacky at 140° C., a polycarbonate film is inserted between the film and each heated platen.

Several additional composites having different polymer substrate layers, metal layers and soft adhesive layers are prepared and tested with the results also being recorded in Table I.

For purposes of comparison, several composites are prepared using various parameters such as adhesives and metal layer thicknesses which are not suitable for the purposes of this invention. These comparative composites (Sample Nos. $A_1$–$A_4$) are also tested and the results recorded in Table I.

TABLE I

| Sample No. | Composite Components(1), Type (Layer Thick., μm) in Order of Combination | Young's Modulus of Soft Adhesive(2), psi | Shore A, Hardness (3) | Peel Strength (4), g/cm | Elongation (5), % | Tensile Strength (5), psi |
|---|---|---|---|---|---|---|
| 1 | PCO(125)/Al(0.5)/S/B(b)(125)/ABS(500) | 650 | 65 | >1000 | >500 | >600 |
| 2 | PCO(125)/Al(0.05)/S/B(b)(125)/PCO(125) | 650 | 65 | >1000 | >500 | >600 |
| 3 | PCO(125)/SnBiCu(0.2)/S/B(b)(25)/ABS(500) | 650 | 65 | <1000 >100 | >500 | >600 |
| 4 | PCO(125)/SnBiCu(0.2)/S/B(a)(50)/ABS(500) | 250 | 45 | >1000 | >500 | >600 |
| 5 | PCO(125)/SnBiCu(0.2)/S/B(b)(50)/ABS(500) | 650 | 65 | <1000 | >500 | >600 |
| 6 | PCO(125)/SnBiCu(0.2)/EVA(a)(50)/ABS(500) | 1100 | 75 | <1000 >100 | >300 | >800 |
| 7 | PCO(125)/SnBiCu(0.2)/S/B(a)(125)/ABS(500) | 250 | 45 | >1000 | >500 | >600 |
| 8 | PCO(125)/SnBiCu(0.2)/S/B(b)(125)/ABS(500) | 650 | 65 | >1000 | >500 | >600 |
| 9 | PCO(125)/SnBiCu(0.2)/Pu(a)(25)/ABS(500) | 250 | 45 | >1000 | >300 | >800 |
| 10 | PCO(125)/SnBiCu(0.2)/S/B(a)(25)/ABS(500) | 250 | 45 | >1000 | >500 | >600 |
| 11 | PCO(125)/SnBiCu(0.2)/S/B(a)(25)/PCO(125) | 250 | 45 | >1000 | >500 | >600 |
| 12 | PCO(125)/SnBiCu(0.2)/S/B(b)(125)/PCO(125) | 650 | 65 | >1000 | >500 | >600 |
| 13 | PCO(125)/SnBiCu(0.2)/EVA(a)(125)/PCO(125) | 1100 | 78 | >1000 | >300 | >800 |
| $A_1$* | PCO(125)/SnBiCu(0.2)/EVA(b)(125)/PCO(125) | 3000 | 87 | <100 | >300 | >1000 |
| $A_2$* | PCO(125)/SnBiCu(0.2)/Pu(b)(125)/PCO(125) | 5000 | >95 | <100 | >100 | >1000 |
| $A_3$* | PCO(125)/SnBiCu(0.2)/LDPE(125)/PCO(125) | 20000 | >95 | <100 | >300 | >1000 |

TABLE I-continued

| Sample No. | Composite Components(1), Type (Layer Thick., μm) in Order of Combination | Young's Modulus of Soft Adhesive(2), psi | Shore A, Hardness (3) | Peel Strength (4), g/cm | Elongation (5), % | Tensile Strength (5), psi |
|---|---|---|---|---|---|---|
| A4* | PCO(125)/SnBiCu(0.2)/ABS(125)/PCO(125) | 300000 | >95 | <100 | >2 | >6200 |

*Not an example of the invention.
(1)PCO - polycarbonate having a number average molecular weight ($M_n$) in the range of 15000-25000 sold under the trade name "Carbonex";
SnBiCu - metal alloy consisting of 80 wt % tin, 14 wt % bismuth and 6 wt % copper;
Pu(a) - polyurethane prepared from the reaction of an aromatic diisocyanate and a polyester polyol and having a $M_n$ sufficiently low that the polyurethane is soluble in methyl ethyl ketone;
Pu(b) - polyurethane prepared from the reaction of an aromatic diisocyanate and a polyester polyol and having a $M_n$ sufficiently high to render the polyurethane insoluble in methyl ethyl ketone;
S/B(a) - polystyrene/polybutadiene block copolymer containing ~25% polystyrene and ~75% polybutadiene and having a melt flow viscosity of 13 decig/min as determined by ASTM D-1238 (Condition E);
S/B(b) - polystyrene/polybutadiene block copolymer containing ~25% polystyrene and ~75% polybutadiene and having a melt flow viscosity of 22 decig/min as determined by ASTM D-1238 (Condition G);
EVA(a) - ethylene/vinyl acetate (72%/28%) copolymer having a melt flow viscosity of 3.5 decig/min (ASTM D-1238 (E)). S/B(a) and S/B(b) are sold by Shell Chemical under trade names Kraton 2113 and Kraton 2112, respectively;
EVA(b) - ethylene/vinyl acetate (81%/19%) copolymer having a melt flow viscosity of 2.6 decig/min (ASTM D-1238 (E));
ABS - ABS resin comprising butadiene rubber, butadiene rubber grafted with styrene and acrylonitrile and styrene/acrylonitrile copolymer. The ABS resin has a melt flow viscosity (ASTM D-1238 (E)) of 3.2 decig/min.
LDPE - low density polyethylene having a density of 0.92 and a melt index (ASTM D-1238 (E)) of 0.25 decig/min.
(2)ASTM D-638
(3)As stated by J. R. Scott in Physical Testing of Rubbers, Palmerton Publishing Co., Inc., pp. 95-97 (1965), the relationship between the International Hardness (Shore Durometer A scale) and Young's Modulus is readily determined from the curve given at page 96 of Scott. The Young's Modulus values of Table I are determined from measured values of hardness and the relationship set forth in Scott on page 96.
(4)ASTM D-413 which is modified to determine support of either 100 g or 1000 g dead load. In all instances, failure occurs at the interface of the substrate polymer and the thin metal layer.
(5)ASTM D-412

As evidenced by the data shown in Table I, a layer of soft adhesive having a Young's Modulus of about 1100 psi or less provides suitable resistance to delamination (peel strength) whereas adhesives having Young's Modulus of 2000 psi or more exhibit unsuitable resistance to delamination.

What is claimed is:

1. A metal/organic polymer composite comprising (1) a normally solid thermoplastic, substrate polymer layer; (2) a normally solid, metal layer having two major surfaces wherein the first of said surfaces is adhered to one surface of the substrate polymer layer, said metal layer having a thickness sufficient to form a substantially continuous layer and less than that which inherently delaminates from the substrate polymer layer; and (3) a layer of a soft adhesive polymer adhered to the second surface of the metal layer, said soft adhesive polymer having toughness and modulus such that upon adhering the composite to a rigid substrate the tendency of the metal layer to separate from the substrate polymer layer is measurably reduced.

2. The composite of claim 1 wherein the soft adhesive polymer has a Young's Modulus less than 1500 psi, an elongation greater than 50 percent and a tensile strength greater than 10 psi.

3. The composite of claim 2 wherein the metal is indium or an alloy of at least two of cadmium, indium, tin, antimony, lead, bismuth, magnesium, aluminum, zinc, copper or silver; the substrate polymer is polycarbonate, thermoplastic polyester, acrylic resin, monovinylidene aromatic polymer, a polymer of vinyl chloride or vinylidene chloride, or acetal resin; and the soft adhesive polymer is a diene rubber, a block copolymer having (1) polystyrene blocks and (2) blocks of polybutadiene or polyisoprene, flexible polyurethanes and other thermoplastic rubber polymers.

4. The composite of claim 2 wherein the substrate polymer is a polycarbonate, a thermoplastic polyester, or a monovinylidene aromatic polymer; the soft adhesive polymer is a flexible polyurethane or a block copolymer of polystyrene and polybutadiene; and the metal is indium, an alloy of about 55 percent tin, about 35 percent bismuth, and about 10 percent silver; an alloy of about 50 percent zinc and about 50 percent cadmium, an alloy of about 80 percent tin, about 15 percent bismuth and about 5 percent copper; an alloy of about 75 percent tin, about 20 percent bismuth and about 5 percent silver; an alloy of about 75 percent tin and about 25 percent silver; an alloy of about 75 percent tin and about 25 percent lead; and an alloy of about 50 percent tin, about 30 percent bismuth and about 20 percent copper, said percentage being by weight.

5. A formed metal/organic polymer composite made from the composite of claim 1 wherein during forming, at least a portion of the composite undergoes a cumulative surface dimensional change of at least 20 percent, said metal being a metal or a metal alloy of two or more metals that melts at a temperature or over a range of temperatures that is from about 80 to about 135 percent of the temperature used in the forming, said temperatures being in °K.

6. The composite of claim 1 wherein the liquidus temperature and the solidus temperature of the metal are within the range from about 0.8 $T_f$ to about 1.35 $T_f$, wherein $T_f$ is the temperature used in forming the composite.

7. The composite of claim 3 wherein the thickness of the metal layer is from about 0.002 to about 1 micrometer and the thickness of the soft adhesive layer is from about 25 to about 250 micrometers.

8. The composite of claim 1 which also comprises a polymeric material adherent to an exposed major surface of the soft adhesive polymer layer, said polymeric material reinforcing the composite.

9. The composite of claim 8 wherein the reinforcing polymeric material is a polyurethane.

10. The composite of claim 8 wherein the reinforcing polymeric material is an ABS resin.

11. The composite of claim 1 wherein the thickness of the metal layer is less than about 1 micrometer.

* * * * *

UNITED STATES PATENT AND TRADEMARK OFFICE
CERTIFICATE OF CORRECTION

PATENT NO. : 4,241,129

DATED : December 23, 1980

INVENTOR(S) : Henry J. Marton; Virgil B. Kurfman

It is certified that error appears in the above—identified patent and that said Letters Patent is hereby corrected as shown below:

Column 1, line 11, after "material", insert --by--.

Column 6, line 6, delete "aforementiond" and insert --aforementioned--.

Column 9, lines 44-45, delete "thermoplastics" and insert --thermoplastic--.

Column 12, Table I, Sample No. 1, delete "0.5" and insert --0.05-- in the second column.

Column 14, line 29, delete the comma "," after "cadmium" and insert a semicolon --;--.

Signed and Sealed this

Twenty-first Day of April 1981

[SEAL]

Attest:

RENE D. TEGTMEYER

Attesting Officer     Acting Commissioner of Patents and Trademarks